Nov. 29, 1966  J. N. CANNIZZARO  3,287,778
COUPLING FOR STEERING CABLE
Filed May 10, 1965

INVENTOR.
JOSEPH N. CANNIZZARO
BY
*James P. Malone*

United States Patent Office 3,287,778
Patented Nov. 29, 1966

3,287,778
COUPLING FOR STEERING CABLE
Joseph N. Cannizzaro, 321 2nd Ave., Brentwood,
Long Island, N.Y.
Filed May 10, 1965, Ser. No. 454,492
4 Claims. (Cl. 24—123)

This invention relates to couplings or repair connections for steering cables of the type used in boats and aircraft.

Cables of this type generally comprise a steel wire cable with a plastic covering. The cables are used for steering elements and control such as used in outboard motor boats, etc. It is difficult or impossible to repair a break in these cables since the cable breaks generally have to pass through pulleys, so that the coupling must be made so that the coupling outside diameter is not appreciably larger than that of the cable.

The present invention provides means to solve this problem of passing through pulleys and is simple and easy to install without requiring the use of any tools.

The invention generally comprises means for coupling a steering cable of the type having a metal wire with a plastic covering comprising a sleeve of braided wire, a pair of ferrules, one affixed to each end of said sleeve, a plurality of barbs on the interior surface of said ferrules, said barbs extending inwardly and toward the center of said sleeve, whereby said barbed sleeve may be slipped onto the ends of th cable desired to be coupled and pulled back to tighten the connection.

Accordingly, a principal object of the invention is to provide new and improved means for steering type cables.

Another object of the invention is to provide new and improved coupling means for steering type cables.

Another object of the invention is to provide new and improved coupling means for steering type cables which will pass through the cable pulleys.

Another object of the invention is to provide new and improved coupling means for steering type cables which will pass through pulleys and which is simple to install and does not require the use of any tools.

Another object of the invention is to provide new and improved coupling means for steering type cables wherein the coupling is flexible and is substantially as strong as the cable.

These and other objects of the invention will be apparent from the following specification and drawings of which:

Referring to the figures, the cable generally comprises a rope like assembly 1 of steel wires which is covered by a plastic cover 2. The purpose of the plastic cover 2 is to protect the cable from corrosion.

The present invention generally comprises a sleeve 3 of braided wire. The wire is preferably thin and flexible and preferably corrosion resistant for instance, bronze, stainless steel or other equivalent material of good tensile strength. At each of the braided sleeve 3 are mounted ferrules 4 and 5 which are secured to the sleeve by any conventional method such as soldering or mechanical crimping. The braid may be secured either inside or outside the ferrule.

Figure 4:
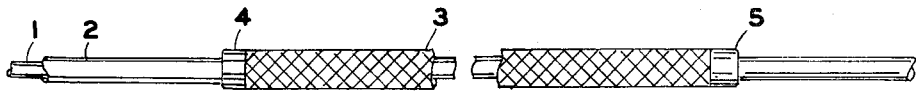
FIGURE 4 is a side view partially cut away showing a complete coupling installed on a broken cable.
Figure 1:
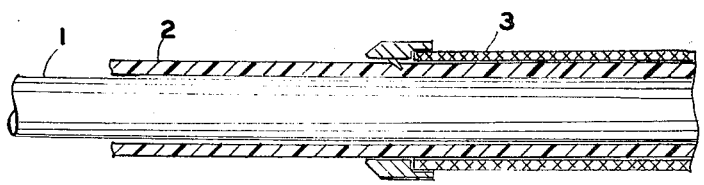
FIGURE 1 is a side view partially in section of an embodiment of the invention.
Figure 3:
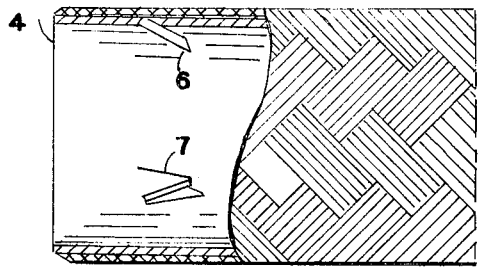
FIGURES 2 and 3 are detailed views.
Figure 2:
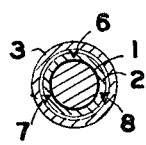

Referring to FIGURES 2 and 3, the ferrules have barbs 6, 7, and 8 mounted on their interior surface as shown in FIGURE 3. The barbs may be stamped out of the ferrule surface. Each of the ferrules is preferably of a strong metal such as steel or equivalent. The barbs are pointed and extended inwardly and toward the center of the sleeve. In other words, they extend away from the open end of the ferrules.

In order to apply the coupling to the cable end, the coupling must be slipped over the ends of the cables so that the inside diameter of the ferrules are slightly larger than the outside diameter of the cable. The coupling may be of the order of 18 inches long and is slipped onto the end of the cable about 6 to 8 inches. The coupling is then drawn back to the end of the cable so that the barbs bite into the plastic surface of the cable which pulling causes the braided sleeve 3 to tighten on the surface of the cable according to the Chinese finger grip principle.

The other end of the coupling is then passed over the other end of the cable and tightened. Any slack is then taken up in the conventional manner and the joint is set by pulling the coupling with a considerable amount of force to set the coupling onto the cable.

The barbs have two functions, one is to grip the cable with sufficient force so that the pulling will cause the braided sleeve to tighten up. If there were no barbs on the cable, it would probably fall off after the first pull since the plastic surface is somewhat slippery before the braided sleeve had a chance to tighten onto the cable.

The other purpose of the barbs is to reinforce the action of the braided sleeve.

Therefore, the present invention provides a strong coupling which may be attached without the use of any tools. Therefore, the present device is very advantageous for emergency repairs while the vehicle is underway.

Furthermore, the coupling is very flexible and will pass through pulleys so that it may also be a permanent coupling, thereby avoiding the necessity of longer lengths of steering control cables. Other equivalent gripping means may be used.

Many modifications may be made by those who desire to practice the invention without departing from the scope thereof which is defined by the following claims.

I claim:

1. Means for coupling a steering cable of the type having a metal wire with a plastic covering comprising,
   a sleeve of braided wire,
   a pair of ferrules, one affixed to each end of said sleeve,
   a plurality of barbs on the interior surface of said ferrules,
   said barbs extending inwardly and toward the center of said sleeve,
   whereby said barbed sleeve may be slipped onto the ends of the cable desired to be coupled and pulled back to tighten the connection.

2. Means for coupling cables comprising,
   a sleeve of braided wire,
   a pair of ferrules, one affixed to each end of said sleeve,
   a plurality of barbs on the interior surface of said ferrules,
   said barbs extending inwardly and toward the center of said sleeve,
   whereby said barbed sleeve may be slipped onto the ends of the cable desired to be coupled and pulled back to tighten the connection.

3. Means for coupling a steering cable of the type having a metal wire with a plastic covering comprising,
   a sleeve of braided wire,
   a ferrule affixed to one end of said sleeve,
   a plurality of barbs on the interior surface of said ferrule,
   said barbs extending inwardly and toward the center of said sleeve,
   whereby said barbed sleeve may be slipped onto the end of the cable desired to be coupled and pulled back to tighten the connection.

4. Means for repairing a steering cable of the type having a metal wire with a plastic covering comprising,
 a sleeve of braided wire,
 a ferrule affixed to one end of said sleeve,
 a plurality of barbs on the interior surface of said ferrule,
 said barbs extending inwardly and toward the center of said sleeve,
 whereby said barbed sleeve may be slipped onto the end of the cable and pulled back to tighten the connection.

References Cited by the Examiner

FOREIGN PATENTS

| 16,140 | 8/1901 | Great Britain. |
| 159,762 | 2/1921 | Great Britain. |

BERNARD A. GELAK, *Primary Examiner.*